Feb. 13, 1934.   D. D. KNOWLES   1,947,093

CONVERTER

Filed Nov. 21, 1929

INVENTOR
Dewey D. Knowles.
BY
ATTORNEY

Patented Feb. 13, 1934

1,947,093

UNITED STATES PATENT OFFICE 1,947,093

CONVERTER

Dewey D. Knowles, Wilkinsburg, Pa., assignor to Westinghouse Electric & Manufacturing Company, a corporation of Pennsylvania Application November 21, 1929
Serial No. 408,789

7 Claims. (Cl. 250—36)

My invention relates to systems and apparatus for the conversion of direct currents into alternating currents and it has particular relation to systems for supplying the high anode-potentials required by the thermionic tubes utilized in modern radio-receivers.

In many parts of the United States, particularly in the business or down-town sections of the larger cities, direct current only is available for the operation of radio-receivers. Inasmuch as the plate-potentials necessary for the operation of thermionic tubes of the power type, such as are used in the final stages of most modern radio-receivers, are greatly in excess of the usual commercial direct-current potentials, such radio-receivers, obviously, cannot be energized directly from the mains. In the past, rotary converters have been utilized for deriving the necessary high potentials from direct-current-distribution systems, but mechanical converters are noisy, expensive and difficult to maintain in satisfactory operation.

It is, accordingly, an object of my invention to provide a simple and relatively inexpensive system for converting direct current into alternating current, at any desired frequency and voltage, for use in situations where the potentials available are inadequate.

Another object of my invention is to provide a system, of the type described, whereby direct current, at commercial potentials, may be converted to alternating current, at commercial frequencies and potentials, whereby radio-receivers, designed for alternating-current energization, may be used in districts where only direct current is available.

Another object of my invention is to provide a system, of the type described, that shall be devoid of moving parts.

A still further object of my invention is to provide a system, of the type described, comprising means whereby the frequency of the alternating current derived may be easily and positively controlled.

In practicing my invention, I make use of the peculiar characteristics of the grid-glow-tube disclosed in my copending application, Serial No. 149,290, filed November 19, 1926 and assigned to the Westinghouse Electric and Manufacturing Company.

A grid-glow-tube, if provided with a thermionically active cathode, has a low internal-voltage drop yet it still retains the characteristic I have termed "discontinuous conductivity" or the property of becoming completely conductive or non-conductive, depending upon the bias-potential applied to the grid thereof. By interconnecting a plurality of grid-glow-tubes through an oscillatory circuit, tuned to the frequency of the alternating current desired, and, by providing feedback connections from the said circuit to the grids of the tubes, I am able to keep the tubes alternately conductive and non-conductive and to, accordingly, maintain an oscillatory current flowing in the said circuit which may be applied, through a power-transformer, to the input terminals of a rectifier of any usual type.

The novel features that I consider characteristic of my invention are set forth with particularity in the appended claims. The invention itself, however, both as to its organization and its method of operation, together with additional objects and advantages thereof, will best be understood from the following description of certain specific embodiments, when read in connection with the accompanying drawing, in which:

Figure 1:
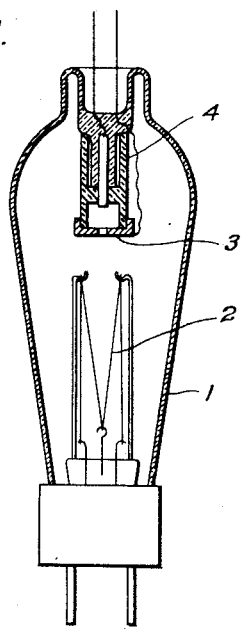
Figure 1 is a view, partly in cross-section, of a grid-glow-tube of the hot-cathode type.

The grid-glow-tube illustrated in Fig. 1 comprises container 1 in which are disposed a thermionic cathode 2, a grid-electrode 3 and an anode 4. The container is filled with an inert gas, such as argon, at a low pressure, the said pressure being such that the mean free path of an electron therein is of the order of the distance between the anode and any part of the grid-electrode.

The structural details of the tube are fully disclosed in the copending application of S. P. Saschoff Serial No. 458,850, filed May 31, 1930 and assigned to the Westinghouse Electric and Manufacturing Company. It is important to note, however, that the device, although it functions strictly in accordance with the theory outlined in my copending application, hereinbefore referred to, has a current-carrying capacity greatly in excess of the tube described in the said application. In fact, the tube may be so designed that it will safely carry 100 or more amperes with an internal drop of only 10–20 volts, when the potential applied between the anode and cathode is of the order of 220 volts.

Figure 2:
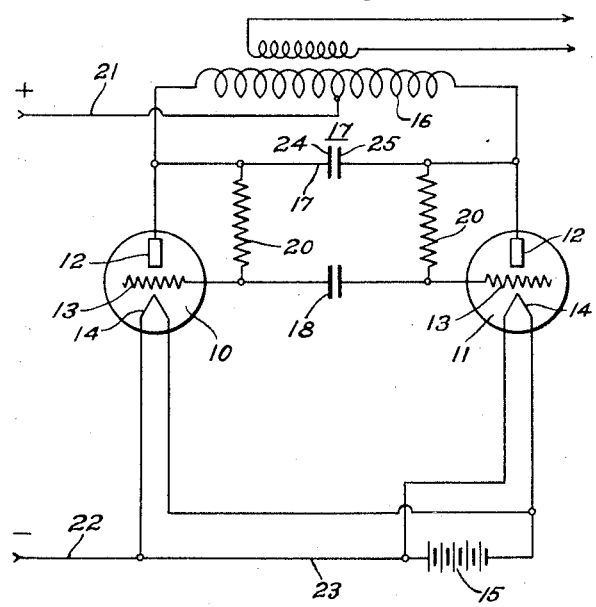
Fig. 2 is a diagrammatic view of a converter system comprising a preferred embodiment of my invention.

The system illustrated in Fig. 2 comprises a plurality of grid-glow-tubes 10 and 11, each tube being provided with an anode 12, a grid 13 and a thermionic cathode 14 and being of the type shown in Fig. 1.

The cathodes of the tubes are supplied, in parallel, with heating current from any convenient source, which, although illustrated in the drawing as a battery 15, may, obviously, be the same commercial source as that from which energy is derived for the operation of the converter system.

The anodes 12 of the tubes are interconnected through a circuit comprising an output inductor 16 and a shunting condenser 17, the said circuit, preferably, being tuned to the desired output-frequency.

The grids of the tubes are coupled through a condenser 18, and each grid is connected to the anode of the same tube by a resistor 20. In commercial apparatus constructed according to my invention and designed for the purpose of converting direct current, at 110 volts, to 60-cycle alternating current, at 110 volts, the condenser 17 has a capacity of 2 mfd, the condenser 18 a capacity of ½ mfd and each of the resistors 20 a resistance of 20,000 ohms.

Direct current is supplied to the system by connecting a positive feeder-wire 21 to an intermediate point on the output inductor 16 and a negative feeder-wire 22 to a conductor 23 that is common to the cathodes of the two tubes.

The explanation of the operation of my improved converter-system is simplified by assuming, first, that both of the grid-glow-tubes are in the non-conductive state, i. e., that they are blocked by high negative charges existing on the several grids, and that, second, the tube 10 then breaks down and conducts a pulse of current. In such event, the condenser 17 receives a charge of approximately 100 volts, the plate 24 thereof being negative and the plate 25 being positive. The condenser 18 is also charged but at an appreciably slower rate, determined by the relative magnitudes of it and the resistors 20.

By reason of the charge acquired by the condenser 18, the grid of the tube 11 is biased positively and, when the bias-potential reaches the critical value of approximately 50 volts, the tube 11 breaks down and permits a current-pulse to pass therethrough.

The condenser 17 functions to extinguish either tube when the other starts to conduct, the charge upon it being such as to momentarily reverse the voltage on the grid-electrode of the tube that is to be rendered non-conductive.

The frequency of the output-current, which may be rendered available for rectification in additional apparatus by utilizing the inductor 16 as the primary winding of a power-transformer, is largely determined by the relative magnitudes of the resistors 20 and the condenser 18. It is, therefore, possible to control the output-current by proper choice of the condenser and resistor magnitudes, in addition to the tuning of the output circuit.

I have found it feasible also to employ direct inductive feed-back between the tubes for the purpose of maintaining oscillations. A system wherein inductive feed-back is used is illustrated in Fig. 3 of the drawing, in which the constituent elements of the system that are analogous to those shown in Fig. 2 are designated by like reference characters.

The inductive feed-back system differs from the resistor-condenser feed-back system by the omission of the coupling condenser between the grids of the tubes and by the substitution therefor of an inductor 30 which is coupled to an inductor 31 that is included, in series with a plurality of coupling condensers 32, between the anodes of the tubes.

The action of the inductively back-coupled converter system is, basically, similar to the action of the system illustrated in Fig. 2. It depends, for its operation, upon the fact that the direction of the current which flows in the inductor 31 is determined by the momentary potentials existing across the condensers 32 and that the induced potentials upon the several grids 13 are always such that the tubes are alternately conducting and non-conducting.

Figure 3:
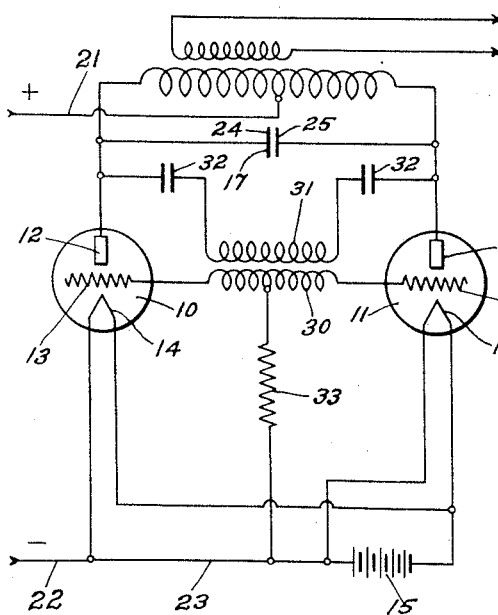
Figs. 3 and 4 are diagrammatic views of converter systems comprising alternative embodiments of my invention.

In order that the grids of the tubes 13, in the system shown in Fig. 3, shall be maintained at the best average potential, a grid-leak 33 is, preferably, connected between the conductor 23 and the mid-point of the inductor 30. A grid-biasing battery (not shown) may be supplied if desired.

I have found it expedient also, in the event that the output-frequency must be kept constant, within narrow limits, to utilize a "driver" or oscillation generator, of any well known type, to fix the frequency.

Figure 4:
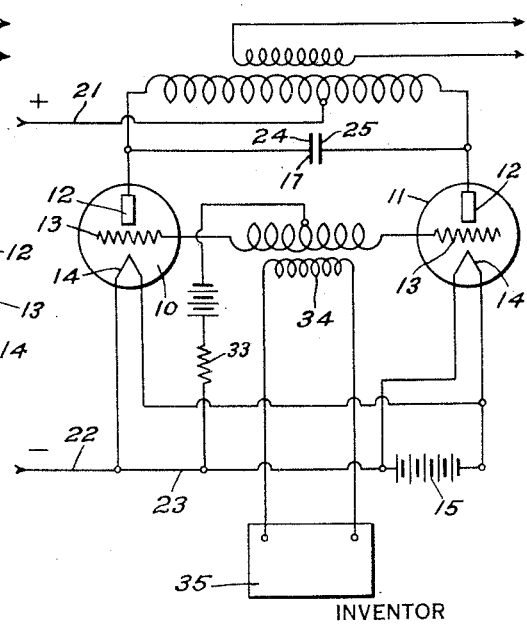

A modified system, wherein the output frequency is determined by means extraneous to the system, is illustrated in Fig. 4 of the drawing, in which figure, elements analogous to the elements in the other figures are designated by like characters.

The driver-controlled system differs from the inductively back-coupled system in the omission of the inductor-condenser circuit between the anodes of the tubes and by the substitution therefor of an inductor 34 carrying alternating currents derived from an oscillation generator 35.

It will be apparent from the foregoing description of various converter systems embodying my invention that I have provided novel means for deriving alternating currents from a direct current source at any desired frequency and at potentials determined solely by the turns-ratio between the primary and secondary winding of an output transformer. Apparatus constructed according to my invention, or any modification within the scope thereof, is, therefore, of great utility as a means for supplying radio-receivers with high potentials in districts where direct current only is available.

Many other advantages of my invention, as well as modifications of the specific embodiments chosen for illustration, will be apparent to those skilled in the art to which it pertains. My invention, therefore, is not to be restricted to the forms thereof shown in the drawing but is to be limited, in scope, only by the prior art and by the spirit of the appended claims.

I claim as my invention:

1. In a converter system, a plurality of electric-discharge devices of the grid-glow type, an oscillatory output circuit comprising a condenser connected between the anodes of the devices, a connection including a coupling condenser between the grids of the devices, and a resistor connected between the anode and the grid of each of the devices, whereby the devices are caused to become alternately conductive and non-conductive upon the application of direct-current potentials between an intermediate point on said output circuit and the cathodes of said devices.

2. A converter system having an input circuit, an output circuit and a circuit coupling said input and output circuits, said coupling circuit including a plurality of gaseous electric-discharge devices having an anode, cathode and grid, a condenser coupling the anodes of said devices, and a second condenser coupling the grids of said devices, said second condenser having less capacity than said first-mentioned condenser, said condenser controlling the extinguishment of the discharge through said gaseous discharge devices.

3. A converter system having an input circuit, an output circuit and a circuit coupling said input and output circuits, said coupling circuit including a plurality of gaseous electric-discharge devices having an anode, cathode and grid, a condenser coupling the anodes of said devices, and a second condenser coupling the grids of said devices, said second condenser having less capacity than said first-mentioned condenser and a resistor connected between the grid and anode of each device.

4. In a converter system, an output circuit, an input circuit, a coupling circuit for said input and output circuits having a plurality of gaseous electric discharge devices having an anode, cathode and grid, a condenser coupling the anodes of said devices, a second condenser coupling the grids of said devices, a resistor connected between the grid and anode of each device and means for applying a direct-current potential between an intermediate point on said output circuit and the cathodes of said devices.

5. A translating system comprising a power source, a gaseous electric discharge device having a control electrode and a plurality of principal electrodes in a gas tight container, the path between said control electrode and the cathode having the property of asymmetric conductivity, means for storing an electric charge, coupled in series with said asymmetric path, means for connecting said power source across said storing means and said asymmetric path, means for supplying a charge to said storing means through said asymmetric conductive path between said control electrode and said principal electrode thereby to impress a potential between said control electrode and said principal electrodes such that the conductivity between said principal electrodes has a small value and means for removing the charge from said storing means thereby to vary the potentials impressed between said control electrode and said principal electrodes and thus to render the path between the principal electrodes highly conductive.

6. A translating device comprising a power source, an electric discharge device having at least an excitable cathode, an anode and a control electrode immersed in a gaseous medium, means for storing an electric charge connected to said control electrodes, means for supplying a charge to said storing means through the conductive path between said cathode and said control electrode, to impress potentials between said control electrode and said cathode and anode such that the conductivity of the path between said cathode and anode is substantially zero, said storing means and said path between said cathode and control electrode being connected to said power source and means including an electric discharge device for removing said charge from said storing means to change the potentials impressed between said control electrode and said cathode and anode to values such that the path between said cathode and anode is conductive.

7. A translating device comprising an electric discharge device having at least an electrode capable of being excited to emit electric charges, a control electrode, and a collecting electrode to cooperate with said emitting electrode to receive the charges emitted thereby, means for storing electric charges connected to said control electrode, means for energizing said emitting electrode, means for directing the charges emitted by said emitting electrode to said storing means over the path between said emitting electrode and said control electrode to impress potentials between said control electrode and said collecting and emitting electrodes such that the path between said collecting electrode and said emitting electrode has a small conductivity, means for removing the charge stored in said storing means to charge the potentials impressed between said control electrode and said emitting and collecting electrodes to vary the conductivity of the path between said emitting and collecting electrodes and means for controlling the rate of supply of charge to said storing means and the rate of removal of charge therefrom.

DEWEY D. KNOWLES.